Oct. 31, 1950   O. E. FIELDS   2,527,625

FLY HOLDER

Filed April 4, 1949

INVENTOR.
OTIS E. FIELDS

BY Joseph B. Gardner
        atty.

Patented Oct. 31, 1950

2,527,625

UNITED STATES PATENT OFFICE 2,527,625

FLY HOLDER

Otis E. Fields, Oakland, Calif., assignor to William H. Reely, San Mateo, Calif.

Application April 4, 1949, Serial No. 85,296

5 Claims. (Cl. 43—25)

The present invention relates to a fishing aid and more particularly to a fish hook holder which may be attached to a fish rod to facilitate the changing of hooks.

Enthusiasts of the sport of angling have long experienced the need of a device, such as the present invention, which simplifies the process of changing hooks. It is often necessary for fishermen to wade into a stream in search of their quarry, and having done so, often find that the fish will not take the particular artificial fly being used. It is then necessary to change to another type of artificial fly which requires the untying of the leader from the hook and retying the leader to a new fly. Since the angler desiring to make such a change of flies is in no position to put the rod down while attempting to perform this operation, he is required to juggle the fish rod, as well as the hooks, while manipulating the leader. Such procedure is dangerous as well as difficult because a slight movement of the rod can easily lodge the hook in the fisherman's hand. The difficulty of changing flies increases as the size of the fly decreases because the eye of the hook becomes quite small. The present invention provides a means for holding the hook in a fixed position with respect to the rod thereby obviating the above-discussed disadvantages.

It is therefore an object of the present invention to provide a fly holder adapted to be secured to a fish rod as a unit.

Another object of the present invention is to provide an artificial fly holder which simplifies the process of changing flies while fishing.

A further object of the present invention is to provide an artificial fly holder which receives a fly and affords ready access to the eye of the hook while tying a leader thereto.

A still further object of the present invention is to provide a fly holder which positions the eye of the hook during the tying operation and which is adapted to allow ready withdrawal upon completion of the knot.

Still another object of the present invention is to provide a simple, inexpensive and rugged artificial fly holder.

Other objects and advantages will be apparent from the following description considered together with the drawing in which.

Figure 1:
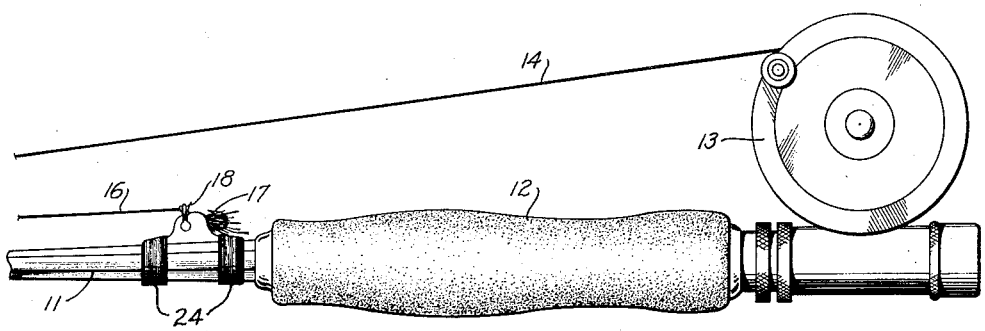
Figure 1 is an elevational view of a portion of a fish rod showing a manner of mounting the present invention thereon.
Figure 2:
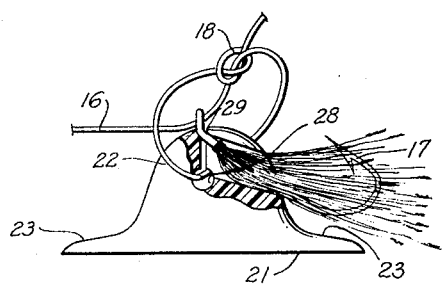
Figure 2 is a side elevation, partially broken away, of the present invention as shown in Figure 1 and illustrating the type of knot formed in the leader.
Figure 5:
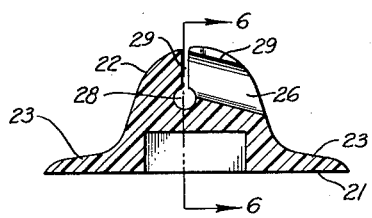
Figure 5 is a sectional elevation of the invention taken along the line 5—5 of Figure 4.

Referring to the drawing in detail, in which similar reference numerals refer to similar elements throughout the various figures illustrated therein, and in particular to Figure 1, a portion of a conventional fish rod 11 having a handle 12 is formed to mount a reel 13 containing a desired length of line, 14. The line 14 is played out from the reel 13 through eyes or guides (not shown) located at convenient intervals along the length of the rod. From the terminal one of such eyes the line is extended a short distance and one end of the leader 16 is secured thereto in any conventional manner. A selected artificial fly hook 17 may then be tied to the free end of the leader 16 by a knot 18.

Figure 3:
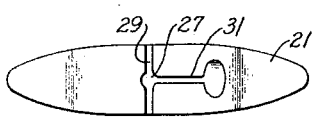
Figure 3 is a plan view of the invention.
Figure 6:
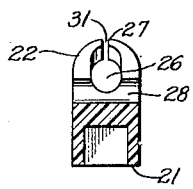
Figure 6 is a sectional elevation taken along the line 6—6 of Figure 5.
Figure 4:
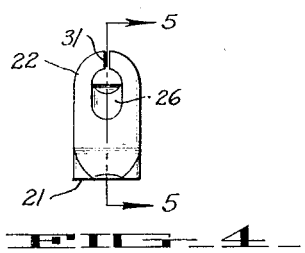
Figure 4 is an end elevational view of the invention.

To provide a means for retaining the hook 17 in a position such that the eye thereof is readily accessible, the present invention has been devised, as shown in Figures 2 to 6 inclusive, and adapted to be attached to the rod 11 in any desired manner and any convenient position. Thus the present invention comprises a longitudinally elongated base 21 having, as illustrated in Figure 3, a substantially elliptical form. Formed as a unit with the base 21 and symmetrically positioned thereon is an upwardly projecting member 22 having a semicircular configuration and being substantially shorter in the longitudinal direction. From the foregoing it is readily seen that the base 21 has a lip 23 extending longitudinally in either direction.

As stated previously the holder may be attached to the rod 11 in any desired manner, and the lips 23 are provided for this purpose. As shown in Figure 1, the holder has been placed at a convenient location on the rod 11 and the lips 23 tightly bound thereto by means of cording 24 in a conventional manner. For receiving the hook 17, the member 22 has a bore 26, extending longitudinally and substantially parallel to the base 21, approximately to the center thereof. A second bore 27 extends from the upper part of the member 22 downward to communicate with the bore 26. Thus by inserting the hook 17 into the bore 26 with the eye forward, the hook will rest with the eye projecting upward from the bore 27 where ready access is possible.

For tying the leader 16 to the eyes of the hook 17, a transverse bore 28 is provided through the member 22 communicating with the other bores 26 and 27 and a narrow slot 29 is formed communicating with the transverse bore 28. Thus it is apparent that the leader 16, having been passed through the eye of the hook 17 and through the bore 28, in either direction, may be drawn up tightly about the hook 17 because of the provision of the slot 29. It is then possible to tie the loose end of the leader 16 around the portion of the leader below the eye of the hook with a single slip knot thereby firmly attaching the hook 17 to the leader 16.

To allow removal of the hook 17 and the attached leader 16 from the holder, another slot 31 is provided in the member 22 communicating with the bore 26 along the edge thereof. The slot 31 then permits the passage of the leader 16 through the holder when the hook 17 is removed.

The holder, in its preferred embodiment, is formed of a relatively rigid composition of a suitable resinous material which is light in weight and yet affords sufficient strength to hold a hook during the tying operation. However, it is to be understood that the present invention is in no way limited to the preferred material.

Withdrawal of the artificial fly and replacement with a new one is a simple matter. With the new artificial fly in position in the holder, the leader 16 is passed through the eye of the hook 17 and through the bore 28. It is then only necessary to tie the leader 16 back on itself in a desired manner and then to tighten the loop formed about the hook. Withdrawal of the hook 17 from the holder is facilitated by the slot 31 which allows free passage of the leader 16. The newly attached artificial fly is therefore rapidly brought into use without undue juggling of the equipment and without danger from the hook.

From the foregoing it is readily apparent that an artificial fly may be carried in the holder when the rod is not in use and that many of the conventional guard devices now manufactured could be replaced by the present invention, with its resultant advantages as heretofore set forth.

While the salient features of the present invention have been described in detail with respect to one embodiment it will, of course, be apparent that numerous modifications may be made within the spirit and scope of this invention and it is therefore not desired to limit the invention to the exact details shown except insofar as they may be described in the following claims.

What is claimed is:

1. In a fish hook holder adapted to be secured to a fish rod, the combination comprising a base, and an upright member formed on said base and having a longitudinal first bore, a vertical second bore communicating with said first bore at its point of furthest penetration, and a slot communicating with said first bore.

2. In a fish hook holder adapted to be secured to a fish rod, the combination comprising a base, means for securing said base to said rod, and an upright member formed on said base and having a longitudinal first bore, a vertical second bore relatively intersecting said first bore, said first and second bores holding said hook with its eye projecting from said second bore, and a slot communicating with said first bore for allowing passage of a leader secured to the eye of said hook.

3. In a fish hook holder adapted to be secured to a fish rod, the combination comprising a base, and an upright member formed on said base and having a longitudinal first bore, a vertical second bore communicating with and substantially normal to said first bore, said first and second bores holding said hook with its eye projecting from said second bore, a transverse third bore communicating with said first and second bores, a first slot communicating with said third bore for allowing the tieing of a leader to said hook, and a second slot communicating with said first bore for allowing passage of said leader when said hook is removed from said bores.

4. In a holder for a fish hook of the artifical fly type adapted to be secured to a fish rod, the combination comprising an elongated base, a symmetrically disposed upright member formed on said base and having a longitudinal dimension less than said base, and means for securing said base on said rod in a convenient position thereof, said member having a longitudinal first bore, a vertical second bore communicating with and substantially normal to said second bore, and a slot communicating with said first bore.

5. In a holder for a fish hook of the artificial fly type adapted to be secured to a fish rod, the combination comprising an elongated base, a symmetrically disposed upright member formed on said base and having a longitudinal dimension less than said base, and means for securing said base on said rod, said member having a longitudinal first bore, a vertical second bore communicating with and substantially normal to said first bore, said first and second bores holding said hook with its eye projecting from said second bore, a transverse third bore communicating with said first and second bores, a first slot communicating with said third bore for allowing the tieing of a leader to said hook, and a second slot communicating with said first bore for allowing passage of said leader when said hook is removed from said first and second bores.

OTIS E. FIELDS.

REFERENCES CITED

The following references are of record in the file of this patent:

UNITED STATES PATENTS

| Number | Name | Date |
|---|---|---|
| 1,627,514 | Kraemer | May 3, 1927 |
| 1,920,478 | Norton | Aug. 1, 1933 |